March 10, 1970 KUNIO GOTO 3,500,157
SYSTEM FOR REMOVING IRREGULARITIES IN ROTATION
FROM SYNCHRONOUS MOTOR
Filed March 6, 1968 3 Sheets-Sheet 1
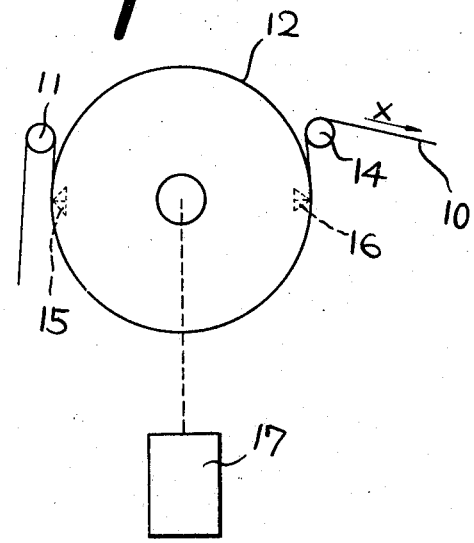
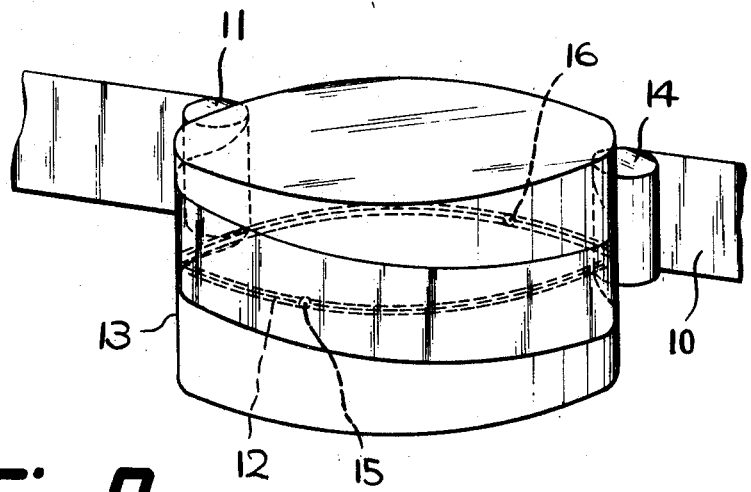
INVENTOR
KUNIO GOTO
BY Louis Bernat
ATTORNEY March 10, 1970  KUNIO GOTO  3,500,157
SYSTEM FOR REMOVING IRREGULARITIES IN ROTATION
FROM SYNCHRONOUS MOTOR
Filed March 6, 1968  3 Sheets-Sheet 2

INVENTOR
KUNIO GOTO

BY Louis Bernat
ATTORNEY

March 10, 1970

KUNIO GOTO 3,500,157

SYSTEM FOR REMOVING IRREGULARITIES IN ROTATION
FROM SYNCHRONOUS MOTOR

Filed March 6, 1968

INVENTOR
KUNIO GOTO

BY *Louis Bernat*

ATTORNEY

United States Patent Office 3,500,157
Patented Mar. 10, 1970

3,500,157
SYSTEM FOR REMOVING IRREGULARITIES IN ROTATION FROM SYNCHRONOUS MOTOR
Kunio Goto, Tokyo, Japan, assignor to Victor Company of Japan, Limited, Yokohama, Japan
Filed Mar. 6, 1968, Ser. No. 711,028
Claims priority, application Japan, Mar. 7, 1967, 42/13,922
Int. Cl. H02p 5/28
U.S. Cl. 318—179          9 Claims

ABSTRACT OF THE DISCLOSURE

The invention provides a system for removing irregularities in the rotation of a synchronous motor. A direct current is applied to the armature in addition to an alternating current, and these currents cause rotational irregularities in rotation to develop in the synchronous motor. The polarity and the value of the direct current is varied so that unwanted irregularities in rotation originally existing in the synchronous motor can be compensated by irregularities in rotation which are intentionally caused to develop.

---

This invention relates to a system for removing irregularities in rotation from synchronous motors, and more particularly to those synchronous motors which are used for driving rotary magnetic heads of video tape recorders in which irregularities in rotation should be minimized.

Synchronous motors used for operating precision machines are generally required to operate so that their rotation is smooth and uniform. However, slight irregularities may result from a slight deviation of the rotor shaft from the center axis, a variation in the mechanical load during one revolution of the rotor, or a distortion of wave form of the power source voltage. Various attempts have hitherto been made to remove irregularities in rotation from synchronous motors. One way to reduce irregularities is to produce precision machine finishes in motor parts and to assemble the parts accurately and precisely. The attempts have so far failed to provide satisfactory results because most of the methods developed are so complicated and exacting that it becomes impossible to carry the methods into practice.

In the system according to this invention, a direct current whose value and polarity are varied is applied to the armature windings of varying phases of a synchronous motor. At the same time, an alternating current for driving the motor is passed therethrough. The position of the center of a revolving magnetic field produced by the alternating current may be displaced toward a direct current magnetic field produced by the direct current. The amount of such displacement corresponds to the intensity of said DC current.

The rotational angular velocity of the rotor is varied in accordance with its phase of rotation to develop irregularities in rotation. The value and polarity of direct current applied to the armature windings of varying phases are selected in such a manner that an irregularity in rotation originally existing in the motor can be compensated by an irregularity in rotation intentionally developed as aforementioned.

Accordingly, the principal object of this invention is to provide a system for removing irregularities in the revolution of synchronous electric motors.

Another object of the invention is to provide a system for removing irregularities in the rotation of synchronous motors responsive to a direct current applied to the armature windings of the motor in addition to an alternating current used for driving the motor. Thus, an irregularity in rotation originally existing in the motor can be compensated by an irregularity in rotation developed intentionally.

Still another object of the invention is to provide a system for removing irregularities in the revolution of synchronous motors by means of a simple circuit for applying a direct current to the armature windings of a synchronous motor in addition to an alternating current used for driving the motor.

One advantage of the system according to this invention lies in the fact that a synchronous motor used with a precision machine or apparatus may be replaced by another synchronous motor. Any difference in irregularities in rotation between the two synchronous motors can readily be removed. Thus, the standards of synchronous motors become much less severe.

Other objects and advantages of the present invention will become apparent from consideration of the following description when taken in conjunction with the accompanying drawings, in which:

FIG. 1 is a schematic view in explanation of essential portions of one embodiment of the conventional magnetic recording and reproducing apparatus;

FIG. 2 is a perspective view of the essential portions shown in FIG. 1;

FIG. 3 is a view showing the arrangement of recording tracks on a magnetic tape of the magnetic recording and reproducing apparatus shown in FIG. 1;

Figure 4:
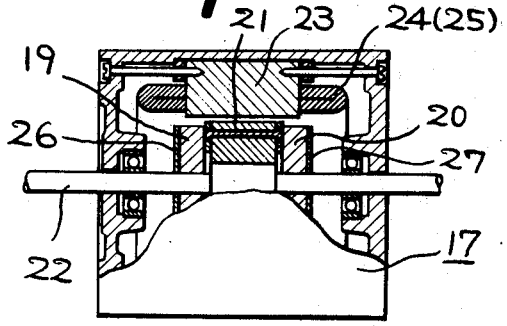
FIG. 4 is a longitudinal partly cross-sectional view of one embodiment of the synchronous motor to which the system according to this invention can be applied.

In order to facilitate an understanding of the invention, FIG. 1 shows one example of the magnetic recording and reproducing apparatus to which this invention can be applied. It is to be understood, however, that the system according to this invention is not limited to the aforementioned type of apparatus. The invention can have application in not only other types of magnetic recording and reproducing apparatus using rotary magnetic heads but also all types of precision machines and apparatus using a synchronous motor.

In FIGS. 1 and 2, the magnetic tape 10 unwound from a supply reel (not shown) is moved by a capstan and a pinch roller (not shown) in the direction of arrow X. The magnetic tape 10 is moved past a guide roller 11, maintained in the manner Ω along substantially one half the outer circumferential surface of a guide drum 13 having a rotary disk 12 built therein, moved past another guide roller 14, and wound around a take-up reel (not shown). Magnetic heads 15 and 16 are mounted on the peripheral edge of the rotary disk 12 at positions diametrically opposed to each other. The rotary disk 12 is rotated by a synchronous motor 17, about its center axis of revolution, at a rate substantially higher than the rate of movement of the magnetic tape.

When signals are recorded on the magnetic tape by the apparatus described above, signal tracks recorded on the magnetic tape can be represented by elongated lines 18 (FIG. 3) parallel to each other and disposed obliquely with respect to the longitudinal axis of the tape, since the magnetic tape 10 is maintained obliquely with respect to the direction of rotation of the magnetic heads 15 and 16 as shown in FIG. 2.

FIG. 4 shows a two-phase synchronous motor 17, in detail. Two ferrite permanent magnets 19 and 20 have their magnetic poles oriented in the same direction. A cage rotor 21 and magnets 19 and 20 are firmly secured to a rotary shaft 22 of the motor for rotation as a unit. The permanent magnets 19 and 20 are separated from a stator 23 by a space of proper dimensions. The stator 23 has armature windings 24 and 25 through which two-phase alternating currents are passed. Two balancing plates 26 and 27 are mounted on the ends of the armature in order to maintain the dynamic balancing of the rotor.

Figure 5:
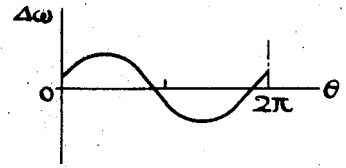
FIG. 5 is a diagram showing one example of irregularities in rotation in a synchronous motor.

Let us assume that video signals corresponding to one field of a television video signal are recorded in a single oblique track shown in FIG. 3. A variation in the rate of revolution of the synchronous motor during one complete revolution can be expressed by the curve shown in FIG. 5. The transverse axis of FIG. 5 represents a rotational angle $\theta$, and the longitudinal axis represents an amount $\Delta\omega$ of deviation of speed from the average rotational angular velocity of the motor. The curve indicates that there is an irregularity in rotation of one cycle during one revolution of the motor.

Figure 7:
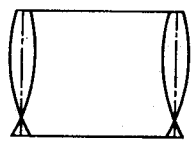
FIG. 7 is a view showing the distortion of a television picture reproduced by a magnetic recording and reproducing apparatus driven by a synchronous motor having the type of irregularity shown in FIG. 5.

If the signals recorded in the tracks on the magnetic tape shown in FIG. 3 are reproduced by means of the apparatus shown in FIG. 2, and if the synchronous motor has an irregularity in revolution as illustrated in FIG. 5, the reproduced picture will show a distortion as illustrated in FIG. 7. This distortion occurs because television video signals of an odd number field and an even number field are reproduced by the magnetic heads 15 and 16, respectively, during one complete revolution of the synchronous motor 17.

Figure 6:
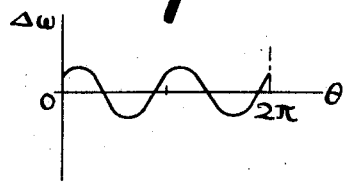
FIG. 6 is a diagram showing another example of irregularities in rotation in a synchronous motor.
Figure 8:
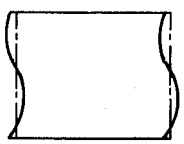
FIG. 8 is a view showing the distortion of a television picture reproduced by a magnetic recording and reproducing apparatus driven by a synchronous motor of the type having the irregularity shown in FIG. 6.

If a synchronous motor showing an irregularity in rotation as illustrated in FIG. 6 is used, the distortion of reproduced picture will be as shown in FIG. 8. The two cycles of irregularity occurring during one complete revolution of the motor render the distortion of picture of an odd number field identical with the distortion of picture of an even number field. In the case of the distortion shown in FIG. 8, the deterioration of the reproduced picture is not marked if the amount of distortion is small. However, distortion of the reproduced picture of the type shown in FIG. 7 markedly impairs the quality of the picture even if the amount of distortion is small.

Figure 9:
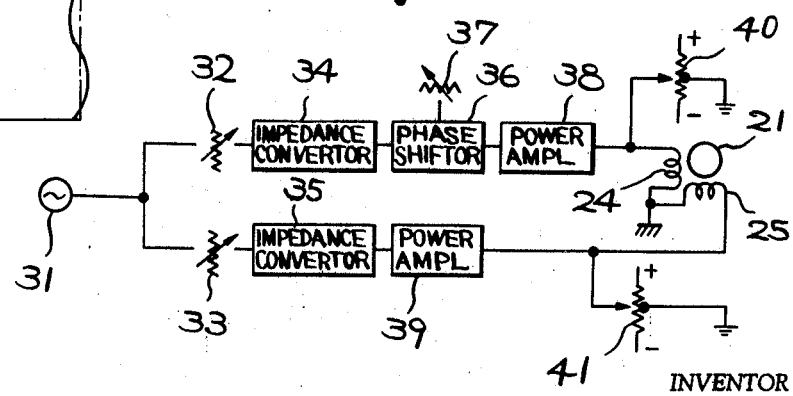
FIG. 9 is a systematic view of one embodiment of the system according to this invention.

The system according to this invention enables a removal of the irregularities in the revolution (described above) of synchronous motors. FIG. 9 shows a systematic diagram of one embodiment of the invention.

Output voltages in sine wave form of desired frequencies of an AC power source 31 are applied to impedance converters 34 and 35, respectively, through gain controllers 32 and 33. The output voltage of the impedance converter 34 is applied to a power amplifier 38 through a phase shifter 36, while the output voltage of the impedance converter 35 is applied directly to a power amplifier 39. The outputs of power amplifiers 38 and 39 are supplied to the armature windings 24 and 25 respectively of the two-phase synchronous electric motor. A variable resistor 37 can adjust the phase shift angle of the output voltage of the phase shifter 36 relative to the phase of the input voltage. This angle can be adjusted within a range of 0° to 180°. A direct current, whose polarity and value can be adjusted by variable resistors 40 and 41, is applied to the armature windings 24 and 25 through said resistors. In addition the alternating current outputs of the power amplifiers 38 and 39 may also be applied to the windings 24 and 25. Accordingly, the rotor 21 of the two-phase synchronous electric motor is rotated by a resultant revolving magnetic field arising from a revolving magnetic field formed by the alternating current flowing to the armature windings 24 and 25 and a unidirectional direct current magnetic field formed by the direct current also flowing to the armature windings 24 and 25.

Figure 10:
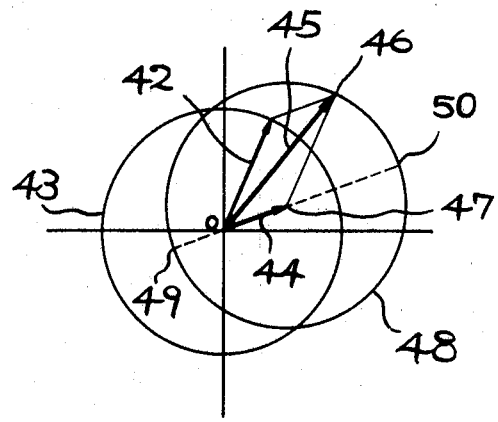
FIG. 10 is a vector diagram showing a revolving magnetic field in an electric motor of the type described herein.

This resultant revolving magnetic field is illustrated in FIG. 10. The revolving magnetic field formed by the two-phase alternating current supplied by the power amplifiers 38 and 39 can be expressed by a vector 42 having a tip revolving about the starting point O, at a constant angular velocity. The stationary magnetic field formed by the direct current supplied through the variable resistors 40 and 41 can be expressed by a stationary vector 44.

Accordingly, the resultant revolving magnetic field arising from the revolving vector 42 and the stationary vector 44 can be expressed by a vector 45. The tip 46 of the vector 45 moves along a circle 48 with its center at the tip 47 of the stationary vector 44. The circle 48 has the same radius as a circle 43 traced by the tip of the revolving vector 42. The angular velocity at which the composite vector 45 revolves about the starting point O is maximized at a point 49 at which the extension, in one direction, of the stationary vector 44 intersects the circle 48. Angular velocity is minimized at a point 50 at which the extension, in the other direction, of the stationary vector 44 intersects the circle 48. In other words, the rotational angular velocity of the resultant magnetic field, about the starting point O, grows higher near the point 49 and smaller near the point 50. Thus, the rotor 21 of the synchronous motor driven by this resultant revolving magnetic field is subjected to a variation of one cycle in speed during one complete revolution.

The size and direction of the vector 44 of the stationary magnetic field can be varied as desired by adjusting the variable resistors 40 and 41. Thus, the amount and phase of a variation in speed of the rotor 21 can be adjusted to any value as desired. It is now evident that one cycle of irregularity occurring during one complete revolution can be compensated by the process described above. The end can readily be attained by adjusting the variable resistors 40 and 41 while viewing the distortion of picture as shown in FIG. 7, in an effort to correct the distortion. The direct current applied to the armature windings, for the purpose of removing irregularities in revolution, may generally be smaller in value than the alternating current applied to the same windings. In the system described above for removing irregularities in revolution, the alternating current portions flowing through the armature windings 24 and 25 must of course be made to differ in phase from each other by 90° by adjusting the variable resistor 37, so that the tip of the revolving vector 42 can draw a true circle.

The system according to this invention permits the removal of an irregularity in revolution which occurs in two cycles as well as in one cycle during one complete revolution. In this case, the gain controllers 32 and 33 are adjusted so that the output currents of the power amplifiers 38 and 39 will have different values. The variable resistor 37 is also adjusted to have a proper value. As a result, the path of the tip of the revolving A.C. vector 42 is not circular (as shown at 43 in FIG. 10) but elliptic in form with the main axis extending in any direction as desired. Accordingly, the path of the tip of the resultant vector 45 forms an ellipse similar to the ellipse formed by the tip of the vector 42. Thus, when the vector of the resultant revolving magnetic field rotates about the starting point O, the rate of revolution of the rotor 21 contains one cycle of speed variation and two cycles of speed variation during one complete revolution. Thus, an irregularity in revolution already existing in a synchronous motor can be compensated by means of this resultant revolving magnetic field.

Next to be described in one process for reducing the consumation of direct current when the same is applied to armature windings of a synchronous motor in addition to alternating current. In the system shown in FIG. 9, direct current portions flow through the variable resistors 40 and 41 at all times where the power is consumed. If a circuit as shown in FIG. 11 is used, the consumption of direct currents can be reduced to a nominal value.

Figure 11:
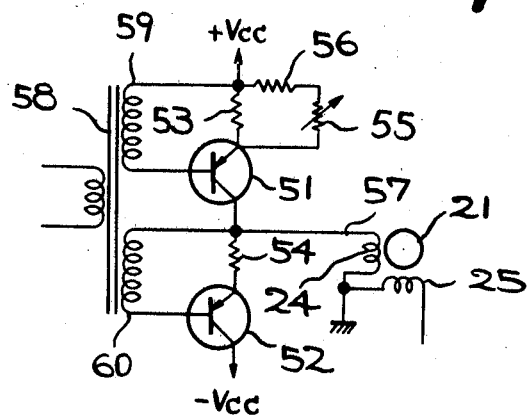
FIG. 11 is a circuit diagram showing one example of the circuit for passing both direct and alternating currents to the motor in the system according to this invention.

The circuit shown in FIG. 11 corresponds to the circuit of the power amplifier 38, the armature windings 24 and 25 and the rotor 21 of the synchronous motor as shown in FIG. 9. A circuit similar to the circuit described is used for the power amplifier 39. Emitter resistances 53 and 54 are connected at one end to the emitters of transistors 51 and 52, respectively. A series circuit of a variable resistor 55 and a fixed resistor 56 is connected in parallel with the emitter resistance 53. The other end of the emitter resistance 54 is connected to the collector of the transistor 51 at a junction 57 which forms an output terminal connected to the armature winding 24.

A direct current voltage +Vcc is applied to the emitter of transsistor 51 through the emitter resistance 53, while a direct current voltage —Vcc is applied to the collector of transistor 52. The DC voltage +Vcc has a positive polarity with respect to the ground and the DC voltage —Vcc has a negative polarity with respect to the ground, the two voltages being equal in value. An input transformer 58 has two secondary windings 59 and 60. The winding 59 has its opposite ends connected to the base of the transistor 51 and to the point of supply of +Vcc voltage respectively. The other winding 60 has its opposite ends connected to the base of transistor 52 and the junction point 57 respectively. The connection is such that when a current signal flows through the primary windings of the transformer 58, the voltages induced in the secondary windings 59 and 60 are equal in amplitude and reversed in polarity with respect to the bases of transistors 51 and 52. The transistors 51 and 52 are selected so that their characteristics are equal to each other.

If the transistors 51 and 52 have a balanced gain when an AC voltage is applied to the primary windings of the transformer 58, only the AC will flow through the armature winding 24 and no DC current will flow. However, if the value of variable resistor 55 is varied so as to break the aforementioned balance in gain between the transistors, the current flowing through the transistors 51 and 52 will have different DC portions, with the result that a DC current corresponding to this difference in DC portions will flow to the armature winding 24. The value and polarity of the DC current in winding 24 can be varied as desired by adjusting the variable resistor 55.

In like manner, a stationary DC magnetic field, and hence a resultant stationary magnetic field, can be formed by this DC current and the DC current flowing through the armature winding 25 when a circuit similar to the circuit described above is connected to the armature winding 25. Thus, any irregularity in revolution can be compensated in the same manner as described with reference to the system shown in FIG. 9.

From the foregoing description, it will be appreciated that the system according to this invention is very advantageous in that irregularities in revolution of synchronous motors can be removed by using a very simple construction. The system is characterized in that irregularities in revolution originally existing in a synchronous motor can be compensated by irregularities in revolution intentionally developed by applying a direct current to the armature windings in addition to an alternating current passed therethrough to drive the motor.

It is evident that the system according to this invention can be applied not only to two-phase synchronous motors but also to three-phase synchronous motors. It is to be understood that the system according to this invention is not limited to the embodiments shown and described herein, and that many changes and modifications may be made therein without departing from the spirit of the invention.

What I claim is:

1. A system for removing irregularities in the revolutions of synchronous electric motors comprising a synchronous motor having a rotor and a plurality of armature windings, means for producing a revolving magnetic field by supplying an alternating current to said plurality of armature windings, means for supplying a direct current to said armature windings, means for varying the value and polarity of the direct current supplied to said armature windings, and means for removing an inherent irregularity in the revolution of said synchronous motor by intentionally producing an irregularity in each revolution of a rotor of said synchronous motor responsive to a resultant magnetic field arising from a stationary magnetic field produced by said varying means and said revolving magnetic field.

2. A system for removing irregularities in the revolutions of synchronous electric motors as claimed in claim 1 in which said revolving magnetic field is a circular revolving magnetic field.

3. A system for removing irregularities in the revolutions of synchronous electric motors as claimed in claim 1 in which said synchronous motor is a two-phase synchronous motor.

4. A system for removing irregularities in the revolutions of synchronous electric motors as claimed in claim 3 in which said revolving magnetic field is a circular revolving magnetic field.

5. A system for removing irregularities in the revolutions of synchronous electric motors as claimed in claim 3, said windings being individually associated with at least two different phases of said alternating current, said means for producing a revolving magnetic field comprising a phase shifter circuit means for varying the phase of output alternating current voltage from the phase of input alternating current voltage by 90°, two adjuster means for adjusting the value of alternating current voltages, means for applying said alternating current voltage to the armature winding of one phase through one of said adjuster means and said phase shifter circuit means, means for applying said alternating current voltage to the armature winding of the other phase through the other of said adjuster means, and means for varying the value of alternating current flowing through the armature windings of different phases by said adjusting means, said revolving magnetic field being an elliptic revolving magnetic field.

6. A system for removing irregularities in the revolutions of synchronous electric motors as claimed in claim 3 in which said means for producing a revolving magnetic field comprises phase shifter circuit means capable of varying the phase of output alternating current voltage from the phase of input alternating current voltage as desired in a range of 0° to 180°, means for applying said alternating current voltage to a first armature winding of one phase through said phase shifter circuit means, and means for applying said alternating current voltage directly to another armature winding of the other phase, said revolving magnetic field being an elliptic revolving magnetic field.

7. A system for removing irregularities in the revolutions of synchronous electric motors as claimed in claim 3 in which said means for producing a revolving magnetic field comprises phase shifter circuit means capable of varying the phase of output alternating current voltage from the phase of input alternating current voltage as desired in a range from 0° to 180°, two adjuster means for varying the value of alternating current voltage, means for applying said alternating current voltage to a first armature winding of one phase through one of said adjuster means and said phase shifter circuit means, means for applying said alternating current voltage to another armature winding of a second phase through the other of said adjuster means, and means including said adjuster means for varying the value of alternating current voltage flowing through the armature windings of the first and second phases, said revolving magnetic field being an elliptic revolving magnetic field.

8. A system for removing rotational irregularities from synchronous electric motors comprising a two-phase synchronous motor, two gain adjusters, two power amplifiers, a phase shifter circuit, means for applying an alternating current voltage to an armature winding of one phase of said synchronous motor through one of said gain adjusters, said phase shifter circuit and one of said power amplifiers, means for applying said alternating current voltage to an armature winding of another phase through the other of said gain adjusters and the other of said power amplifiers, two variable resistors for varying the value and polarity of an output voltage, means for applying a direct current voltage to said armature winding of one phase through one of said variable resistors, means for applying said direct current voltage to said armature winding of another phase through the other of said variable resistors, and means for compensating for an inherent rotational irregularity in said synchronous motor by intentionally developing an irregularity in each revolution of a rotor in said synchronous motor responsive to a resultant magnetic field arising from a revolving magnetic field produced by said two means for applying an alternating current voltage and a stationary magnetic field produced by said two means for applying a direct current voltage.

9. A system for removing rotational irregularities from synchronous electric motors as claimed in claim 8 in which each of said power amplifiers comprises a series element consisting of two transistors each having an emitter resistance, one of said resistances being connected between the emitter of one transistor and the collector of the other transistor, an input transformer having two secondary windings for inducing voltages of equal amplitude and reversed polarity to base electrodes of said transistors, and an output terminal for taking an output from the junction point of the collector electrode of the other of said transistors and said one emitter resistance; each of said variable resistors being connected in parallel with the other of said emitter resistances which is not connected to said output terminal; said means for applying a direct current voltage to said armature winding of one phase through one of said variable resistors comprises, in one of said power amplifiers, means for applying a direct current voltage to the collector electrode of said one transistor which is not connected to said output terminal, and means for applying a direct current voltage which has the same amplitude as but is reversed in polarity from said first mentioned direct current voltage to the junction point of the parallel circuit element consisting of said variable resistor and the emitter resistance which is not connected to the emitter of the other transistor; and said means for applying said direct current voltage to the armature winding of another phase through the other of said variable resistors comprises, in the other of said power amplifiers, means for applying a direct current voltage to the collector electrode which is not connected to said output terminal, and means for applying a direct current voltage which has the same amplitude as but is reversed in polarity from said first mentioned direct current voltage to the junction point of the parallel circuit element consisting of said variable resistor and the emitter resistance which is not connected to the emitter of the other transistor.

References Cited
UNITED STATES PATENTS

| | | | |
|---|---|---|---|
| 2,415,405 | 2/1947 | Barney | 318—184 XR |
| 2,910,340 | 10/1959 | Warrick | 318—174 XR |
| 3,238,432 | 3/1966 | Amberger | 318—184 XR |
| 3,388,305 | 6/1968 | Smith | 318—179 XR |

ORIS L. RADER, Primary Examiner

G. RUBINSON, Assistant Examiner

U.S. Cl. X.R.

318—184